United States Patent
Hughes et al.

(10) Patent No.: US 10,399,860 B2
(45) Date of Patent: Sep. 3, 2019

(54) SYNTHESIS OF AMMONIA

(71) Applicant: Siemens Aktiengesellschaft, Munich (DE)

(72) Inventors: Timothy Hughes, Wantage (GB); Ian Wilkinson, Witney (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/776,721

(22) PCT Filed: Nov. 2, 2016

(86) PCT No.: PCT/EP2016/076455
§ 371 (c)(1),
(2) Date: May 16, 2018

(87) PCT Pub. No.: WO2017/084878
PCT Pub. Date: May 26, 2017

(65) Prior Publication Data
US 2018/0297855 A1    Oct. 18, 2018

(30) Foreign Application Priority Data

Nov. 16, 2015 (GB) .................................. 1520213.8

(51) Int. Cl.
*C01C 1/04* (2006.01)
*B01J 19/18* (2006.01)
*F02B 43/10* (2006.01)

(52) U.S. Cl.
CPC ............. *C01C 1/0417* (2013.01); *B01J 19/18* (2013.01); *B01J 19/185* (2013.01); *F02B 43/10* (2013.01); *Y02P 20/52* (2015.11)

(58) Field of Classification Search
CPC ........ C01C 1/0417; F02B 43/10; B01J 19/18; B01J 19/185; Y02P 20/52
See application file for complete search history.

(56) References Cited

U.S. PATENT DOCUMENTS 1,936,167 A * 11/1933 Kniskern ............... C01C 1/0405
                                                          252/377
2,799,562 A *  7/1957 Bresler .................. C01C 1/0447
                                                          417/275
(Continued)

FOREIGN PATENT DOCUMENTS

| CN | 201059251 Y | 5/2008 |
| GB | 217747 A | 6/1924 |
| GB | 2 114 461 A | 8/1983 |
| WO | WO-2015/152518 A1 | 10/2015 |

OTHER PUBLICATIONS

Murakami et al., "Electrolytic Synthesis of Ammonia in Molten Salts Under Atmospheric Pressure", J. Amer. Chem. Soc. 125 (2), pp. 334-335 (2003).
(Continued)

*Primary Examiner* — Hung Q Nguyen
(74) *Attorney, Agent, or Firm* — Schiff Hardin LLP

(57) ABSTRACT

An ammonia synthesis apparatus has a piston arranged to reciprocate within a cylinder, a piston rod arranged to drive the piston in a reciprocal motion within the cylinder, an inlet valve linking a supply of nitrogen and hydrogen to the interior of the cylinder; an outlet valve allowing exhaust of ammonia from the cylinder, and a drive mechanism providing drive to the piston rod.

15 Claims, 2 Drawing Sheets

(56) References Cited

U.S. PATENT DOCUMENTS

| | | | | |
|---|---|---|---|---|
| 4,532,431 | A | * | 7/1985 | Iliev ........................ F02B 63/04 123/46 E |
| 6,541,875 | B1 | * | 4/2003 | Berlinger ................ F02B 71/04 123/46 E |
| 2005/0019244 | A1 | | 1/2005 | Spiegelman et al. |
| 2007/0107432 | A1 | | 5/2007 | Smith |
| 2009/0202417 | A1 | | 8/2009 | Carpenter |
| 2011/0243828 | A1 | | 10/2011 | Gordon |
| 2012/0070364 | A1 | | 3/2012 | Malhotra et al. |
| 2012/0126544 | A1 | * | 5/2012 | Simpson ................ F02B 63/04 290/1 A |
| 2012/0312105 | A1 | * | 12/2012 | Del Campo ............ F04B 9/042 74/25 |
| 2013/0252120 | A1 | | 9/2013 | Robertson |
| 2013/0272926 | A1 | | 10/2013 | Gordon |

OTHER PUBLICATIONS

Murakami et al., "Electrolytic Ammonia Synthesis from Water and Nitrogen Gas in Molten Salt Under Atmospheric Pressure", Electrochim. Acta 50 (27), pp. 5423-5426 (2005).

Marnellos et al. (2000). Synthesis of ammonia at atmospheric pressure with the use of solid state proton conductors. J. Catal. 193, 80-88.

Lan et al., S.(2013). Synthesis of 30 ammonia directly from air and water at ambient temperature and pressure. Sci.Rep. 3, 1145.

Skodra et al., "Electrocatalytic synthesis of ammonia from steam and nitrogen at atmospheric pressure." (2009). Solid State Ionics 180, 1332-1336.

\* cited by examiner

SYNTHESIS OF AMMONIA

BACKGROUND OF THE INVENTION

Field of the Invention

The present invention relates to an apparatus for synthesis of ammonia $NH_3$. The present invention also relates to processes for synthesis of ammonia $NH_3$.

Description of the Prior Art

Known approaches to the requirement for synthesis of ammonia include:

(1) Haber Bosch process—pressurization and heating of N2 and H2 over an iron catalyst;

(2) Electrochemical synthesis with a molten salt electrolyte and gas electrodes [1-3]; and (3) Electrochemical synthesis with a solid electrolyte and eletrocatalytic electrodes [4-6].

[1] Murakami T., T. Nishikiori, T. Nohira, and Y. Ito, "Electrolytic Synthesis of Ammonia in Molten Salts Under Atmospheric Pressure", J. Amer. Chem. Soc. 125 (2), pp. 334-335 (2003).

[2] Murakami T. et al., "Electrolytic Ammonia Synthesis from Water and Nitrogen Gas in Molten Salt Under Atmospheric Pressure", Electrochim. Acta 50 (27), pp. 5423-5426 (2005).

[3] U.S. Pat. No. 6,881,308 B2

[4] Marnellos, G., Zisekas, S., and Stoukides, M. (2000). Synthesis of ammonia at atmospheric pressure with the use of solid state proton conductors. J. Catal. 193, 80-88. doi:10.1006/jcat.2000.2877

[5] Lan, R., Irvine, J. T. S., and Tao, S. (2013). Synthesis of 30 ammonia directly from air and water at ambient temperature and pressure. Sci. Rep. 3, 1145. doi:10.1038/srep01145

[6] Skodra, A., and Stoukides, M. (2009). Electrocatalytic synthesis of ammonia from steam and nitrogen at atmospheric pressure. Solid State Ionics 180, 1332-1336.

SUMMARY OF THE INVENTION

The present invention seeks to provide alternative methods and apparatus for the synthesis of ammonia from hydrogen $H_2$ and nitrogen $N_2$.

The above object is achieved in accordance with the invention by an ammonia synthesis apparatus and method, as well as a method of energy storage, using an ammonia synthesis apparatus having a piston that reciprocates within a cylinder, a piston rod that drives the piston in a reciprocal motion within the cylinder, an inlet valve that communicates a supply of storage and hydrogen to the interior of the cylinder, an outlet valve that allows exhaust of ammonia from the cylinder, and a drive mechanism that drives the piston rod, wherein the drive mechanism includes a linear electric motor controlled by a controller.

DESCRIPTION OF THE PREFERRED EMBODIMENTS

Figure 1:
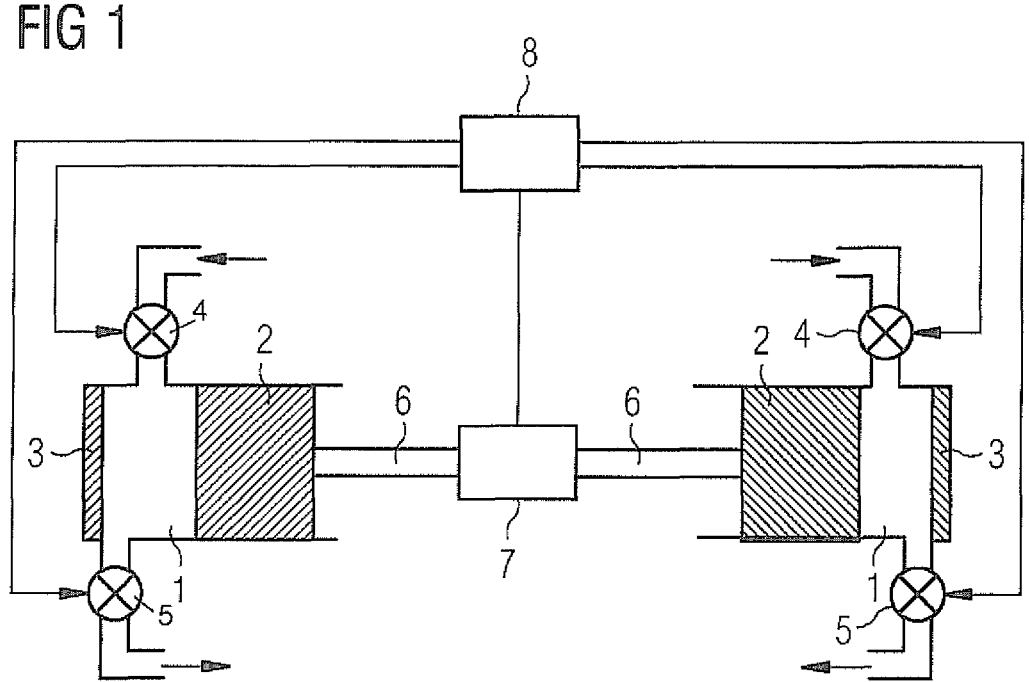
FIG. 1 illustrates an exemplary arrangement for synthesis of ammonia according to an embodiment of the present invention.

FIG. 1 shows an embodiment of the present invention, illustrating a dual-piston reciprocal arrangement for synthesis of ammonia.

Cylinders 1 are each provided with a piston 2, which is preferably gas-tight, driven by an associated piston rod 6. The piston rods 6 are driven in anti-phase by linear electric motor 7. A controller 8 is provided to control operation of the linear electric motor 7.

Within each cylinder is provided a catalyst 3, for promoting the reaction $N_2 + 3H_2 \Rightarrow NH_3$, such as iron (Fe) or rhodium (Rh). Preferably, the catalyst is provided in a porous form.

A stoichiometric mixture of nitrogen and hydrogen is provided at inlet valve 4 for each cylinder. An outlet valve 5 is also provided for each cylinder, to enable the synthesized ammonia to be retrieved.

Figure 2:
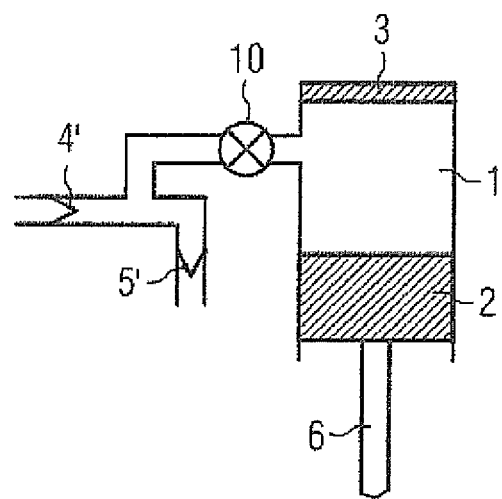
FIG. 2 illustrates an alternative valve arrangement.

In operation, starting the cycle at an arbitrary location, the piston 2 is withdrawn and inlet valve 4 is opened. This may, for example, be by operation of an electrically-operated valve under control of controller 8, or may be a mechanical valve opening by mechanical interaction with the linear motor 7. Once the piston is withdrawn to its fullest extent, inlet valve 4 closes. The cylinder is then filled with the stoichiometric mixture of hydrogen and nitrogen. The piston 2 is then driven back into the cylinder 1 with inlet valve 4 closed and outlet valve 5 closed. The resulting compression of the gas mixture causes heating. The heated gas mixture, in contact with the catalyst 3, reacts to produce ammonia. The piston 2 is again withdrawn, cooling the synthesized ammonia. Outlet valve 5 is opened. This may, for example, be by operation of an electrically-operated valve under control of controller 8, or may be a mechanical valve opening by mechanical interaction with the linear motor 7. The synthesized ammonia is exhausted from the cylinder 1 by the piston 2 being driven back into the cylinder. As the piston 2 begins to withdraw again, inlet valve 4 opens to admit a new volume of stoichiometric mixture of nitrogen and hydrogen, and the process repeats. As shown in FIG. 2, there may be provided two cylinders operated in antiphase by a linear motor 7 under control of a controller 8. The valves may be electrically controlled by the controller, or may be mechanically controlled by mechanical interaction with the linear motor 7.

The ammonia exhausted through outlet valve 5 may be directed to a storage arrangement.

Although two pistons, as illustrated, operated in anti-phase, provide a more regular flow of gases through the inlet and outlet valves 4, 5, the present invention may be embodied as a single piston operated by a linear motor.

The catalyst 3 is provided to ensure a suitable reaction rate which enables useful synthesis of ammonia during a piston cycle. The use of a piston provides a convenient and efficient means for applying heat to the gas mixture. The invention may be operated without the catalyst 3, although the rate of generation of the ammonia will fall accordingly.

The nitrogen and hydrogen raw materials may be provided from any convenient source. The hydrogen may be generated from electrolysis of water.

The apparatus of the present invention may be employed to synthesize ammonia as an energy storage medium. For example, electrical generators in the form of renewable energy sources such as wind turbines or solar panels may generate electricity intermittently, out of synchronization with demand for energy. Such electrical generators may be employed to generate ammonia by use of the equipment and method of the present invention, and the generated ammonia may later be combusted in an energy recovery step.

Other valve arrangements, different from those shown in FIGS. 1, 2 may be employed. For example, FIG. 2 illustrates an alternative valve arrangement in which inlet valve 4' and outlet valve 5' are uncontrolled unidirectional mechanical valves such as flap valves, and a controlled valve 10 is provided to allow access to and from the chamber 1. In an inlet phase, controlled valve 10 is open and the piston withdraws from the cylinder, reducing pressure in the cylinder. This reduced pressure keeps outlet valve 5' closed and causes inlet valve 4' to open, allowing the mixture of hydrogen gas H2 and nitrogen gas N2 to enter the cylinder. During a compression phase, the controlled valve 10 is closed. During an expansion phase, the controlled valve 10 remains closed. During an exhaust phase, controlled valve 10 is opened. The piston is driven into the cylinder, causing an increase in gas pressure within the cylinder. This increased pressure holds inlet valve 4' closed and causes outlet valve 5' to open, allowing the synthesized ammonia to exhaust from the cylinder. Other valve arrangements may be provided, as will be apparent to those skilled in the art. Controlled valve 10 may be electrically controlled by a controller, or may be mechanically controlled by mechanical interaction with a motor driving the piston 2.

The invention has been described with particular emphasis on introducing a nitrogen/hydrogen mixture in stoichiometric ratio. The invention may be operated with the mixture of gases in another ratio, in which case the ammonia exhausted from the ammonia synthesis apparatus of the present invention will include some unreacted gas. For safety considerations, it would be preferable if nitrogen were present in excess, rather than hydrogen. A later step, for example liquefaction of ammonia, may be employed to separate the synthesized ammonia from unreacted nitrogen or hydrogen.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. Ammonia synthesis apparatus comprising a piston arranged to reciprocate within a cylinder, a piston rod arranged to drive the piston in a reciprocal motion within the cylinder; an inlet valve linking a supply of nitrogen and hydrogen to the interior of the cylinder; an outlet valve allowing exhaust of ammonia from the cylinder, and a drive mechanism providing drive to the piston rod, wherein the drive mechanism comprises a linear electric motor under control of a controller.

2. Ammonia synthesis apparatus according to claim 1, further comprising a porous catalyst within the cylinder.

3. Ammonia synthesis apparatus according to claim 2 wherein the porous catalyst comprises iron or rhodium.

4. Ammonia synthesis apparatus according to claim 1 comprising a further piston arranged to reciprocate within a further cylinder, a further piston rod arranged to drive the further piston in a reciprocal motion within the further cylinder; a further inlet valve linking a supply of nitrogen and hydrogen to the interior of the further cylinder; and a further outlet valve allowing exhaust of gas from the cylinder, wherein the further piston rod (6) is arranged to be driven by the drive mechanism.

5. Ammonia synthesis apparatus according to claim 4, wherein a porous catalyst is provided within the further cylinder.

6. Ammonia synthesis apparatus according to claim 5 wherein the porous catalyst within the further cylinder comprises iron or rhodium.

7. Ammonia synthesis apparatus according to claim 1, further comprising a storage arrangement connected to receive the ammonia exhausted from the outlet valve.

8. An energy storage apparatus comprising:
   an ammonia synthesizing apparatus comprising a piston arranged to reciprocate within a cylinder, a piston rod arranged to drive the piston in a reciprocal motion within the cylinder, an inlet valve linking a supply of nitrogen and hydrogen to the interior of the cylinder: an outlet valve allowing exhaust of ammonia from the cylinder, and a drive mechanism providing drive to the piston rod, wherein the drive mechanism comprises a linear electric motor under control of a controller;
   an electrical generator that supplies power to the ammonia synthesizing apparatus; and
   a storage arrangement connected to receive ammonia from the ammonia synthesizing apparatus.

9. A method for the synthesis of ammonia comprising the steps of:
   introducing a mixture of hydrogen and nitrogen into a piston cylinder;
   compressing the mixture by operation of a drive mechanism arranged to drive a piston in a reciprocal motion within the piston cylinder, thereby heating the mixture to cause synthesis of ammonia from the mixture; and
   removing synthesized ammonia from the piston cylinder, wherein the drive mechanism comprises a linear electric motor under control of a controller.

10. A method according to claim 9, wherein a catalyst comprising iron or rhodium is provided within the cylinder.

11. A method according to claim 9 wherein the mixture of hydrogen and nitrogen comprises hydrogen and nitrogen in stoichiometric ratio for synthesis of ammonia.

12. A method according to claim 9 further comprising the step of storing the synthesized ammonia.

13. A method according to claim 9 further comprising the step of liquefaction of the ammonia.

14. A method of energy storage comprising the steps of:
   generating electricity; and
   using the generated electricity to operate an ammonia synthesizing apparatus comprising a piston arranged to reciprocate within a cylinder, a piston rod arranged to drive the piston in a reciprocal motion within the cylinder; an inlet valve linking a supply of nitrogen and hydrogen to the interior of the cylinder: an outlet valve allowing exhaust of ammonia from the cylinder, and a drive mechanism providing drive to the piston rod, wherein the drive mechanism comprises a linear electric motor under control of a controller by introducing a mixture of hydrogen and nitrogen into the piston cylinder, compressing the mixture by operation of the drive mechanism arranged to drive piston in reciprocal motion within the cylinder, thereby heating the mixture to cause synthesis of ammonia from the mixture, and removing synthesized ammonia from the cylinder.

15. A method for energy storage according to claim 14 further comprising a step of combusting of the synthesized ammonia for energy generation.

* * * * *